United States Patent Office 3,065,320
Patented Nov. 20, 1962

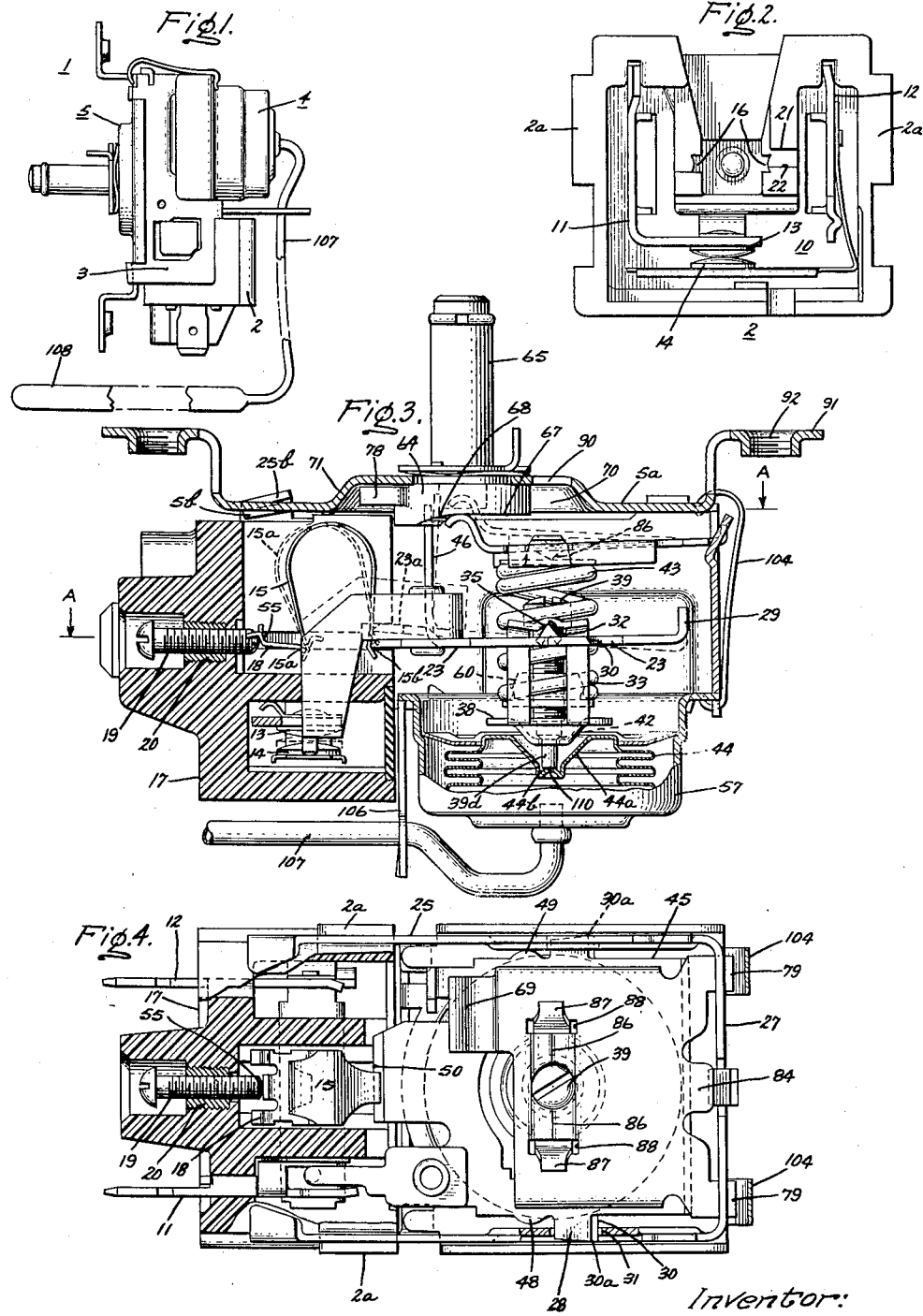

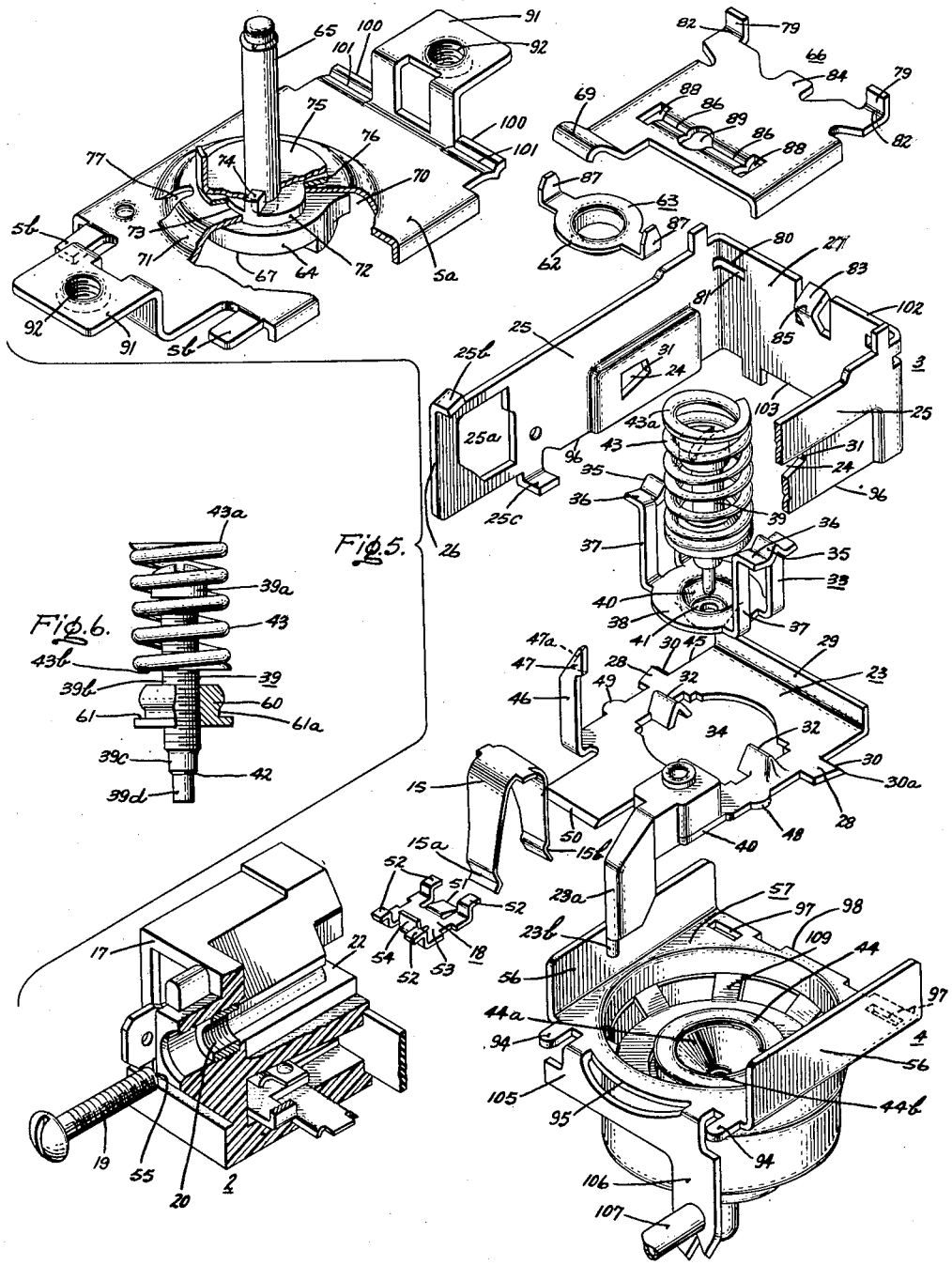

3,065,320
CONDITION RESPONSIVE ELECTRIC
SWITCH MECHANISM
Richard W. Cobean, Morrison, Ill., assignor to General
Electric Company, a corporation of New York
Filed June 5, 1959, Ser. No. 818,437
12 Claims. (Cl. 200—140)

This invention relates to electric switch mechanisms and is particularly applicable to automatic temperature control switches for use in connection with electric refrigerators.

Refrigerating machines of the conventional types such as household refrigerators, freezers, and air conditioning units, are customarily controlled by means of a switch which automatically starts the machine, in response to a first predetermined condition, such as predetermined upper temperature, and subsequently stops the machine, in response to a second predetermined condition, such as a predetermined lower temperature. In such switches, a condition responsive element such as a thermally responsive bellows, provides a mechanical force for controlling the circuit of the machine by opening or closing the contacts of the switch.

A common form of such condition responsive electric switches is generally referred to as a "constant differential cold control." Switches of this type are ordinarily constructed to initiate the refrigerating operation at a selectively adjustable upper temperature and subsequently to terminate the refrigerating operation at a predetermined number of degrees below the upper temperature. In this type of switch, adjustment of the upper temperature at which refrigeration is initiated, is accompanied by a corresponding change in the lower temperature at which the refrigeration cycle is terminated. The temperature differential, or the difference in the temperature between initiation and termination of the refrigerating cycle, is preset by a separate adjustment, and remains essentially constant for any one setting throughout the entire temperature range of the switch.

Such a switch is expected to provide reliable and consistent sensitivity with continuous use over a long period of years, while maintaining very close calibration. In the past, such condition responsive switching mechanisms have been subject to calibration shift or inconsistent operative effects, due to the manner whereby the condition responsive force is transmitted to the operating member of the switch. In transmitting this condition responsive force to the operating member, it has been found convenient to utilize an intermediate or bearing member to receive the force of the condition responsive means and transmit it to the operating member. To control the effect of the condition responsive force acting upon this bearing member, a biasing spring is also often provided. This spring exerts a biasing force upon the bearing member and the resultant of the condition responsive force and the biasing force is transmitted to the operating member by the bearing. To provide consistent operation of the contacts of this switch, it is vitally important that the resultant of the condition responsive force and the spring biasing force be transmitted to the operating member by the bearing member, at exactly the same position and angle each time the operating member is actuated.

If this consistent operative effect does not occur, the resulting consequence is that the bearing member may engage the operating member at a different position on the operating member for each "on" and "off" cycle, thereby causing an appreciable shift in calibration. In prior cold controls such shifts in calibration have presented a problem, being caused by various indeterminate variables such as imprecise mounting of the bearing member on the operating member, and departure of the biasing spring from a perfectly square or aligned condition.

Accordingly, it is the primary object of this invention to provide an improved condition responsive electric switch wherein precise and consistent actuation of the contact operating member is obtained throughout the life of the switch.

Another object of my invention is to provide an improved condition responsive switch having a very accurate, but yet inexpensive and readily assembled, means for transmitting the actuating force from a condition responsive element to the contact operating member.

In carrying out my invention, in one form thereof, I provide an improved condition responsive electric switch having a pair of contacts and a contact operating member. To transmit the condition responsive force to the operating member, a force transmitting bearing and an actuator are utilized. This force transmitting bearing and the contact operating member include a knife edge contact therebetween, which is so arranged that it does not vary from cycle to cycle. The actuator engages the bearing and urges it against the operating member to actuate the switch contacts. A condition responsive means urges the actuator in one direction, while a control biasing spring urges the actuator in an opposite direction. The actuator takes the difference between the forces of the condition responsive member and the spring, and transmits this difference to the bearing to actuate the operating member and thereby operate the switch contacts. By one aspect of my invention, the knife edge contact between the operating member and the bearing is provided by a pair of aligned grooves on the bearing which fit over V-shaped knife edges of the operating member. The bearing may swivel around the actuator, and the grooves thereby fit over the knife edges from cycle to cycle to provide the same precise actuation of the operating member.

By further aspects of my invention, additional desirable features may be included in the switch, and the specification concludes with claims particularly pointing out and distinctly claiming the subject matter which I regard as my invention. The invention, however, as to organization and method of operation, together with further objects and advantages thereof, may best be understood by reference to the following description when taken in conjunction with the accompanying drawings, in which:

FIG. 1 is a side elevational view of an improved condition responsive electric switch embodying my invention in one form thereof;

FIG. 2 is an end view of the insulating base of the switch;

FIG. 3 is a side elevational view partially in section and partially broken away, of the switch of FIG. 1, with dotted lines representing certain alternate operating positions of certain movable parts of the switching mechanism;

FIG. 4 is a sectional view taken along the line A—A of FIG. 3;

FIG. 5 is an exploded view showing the various parts of the switch of FIG. 1 with the cover assembly, the base, and the frame, partially broken away; and FIG. 6 is a side elevational view partially in section of the range biasing spring and altitude adjustment assembly of the switch.

Referring now to FIG. 1, there is shown a temperature responsive switch 1 which embodies one form of my invention, and which is commonly referred to as a "cold control." Certain features of this switch, other than those claimed herein, are the invention of Charles Grimshaw, and are described in detail and claimed in the copending application, Serial Number 818,436 filed concurrently herewith and a divisional application thereof Serial No. 183,534 filed on March 29, 1962, both of said applications being assigned to the same assignee as the present invention. The switch 1 includes an insulating base 2 which, for example, is formed of molded phenolic thermosetting plastic, and a U-shaped frame 3 which is formed of a suitable material such as stainless steel and is securely mounted to base 2. Frame 3 conveniently supports bellows assembly 4, which provides a temperature responsive force, and cover assembly 5, which includes means for mounting the switch upon a suitable supporting panel.

As best shown in FIGS. 2 to 4, insulating base 2 serves as a mounting for terminals 11 and 12, the inner portions of which are contained within a generally U-shaped internal cavity 10 of the base. Terminals 11 and 12 are fastened to base 2 by staking, and provide supports for relatively fixed contact 13 and movable contact 14 of the switch. These contacts are housed in the lower portion of cavity 10 of the base and are normally biased to their closed position.

In order to provide snap action for the switch contacts, I have provided U-shaped toggle spring 15. This spring is in continuous compression between pivot member 18 and contact operating member or lever 23, to continuously bias the contact operating member to its closed or non-actuating position, away from the switch contacts. For adjusting the biasing force of spring 15, oppositely disposed channels 16 are molded into base 2. These channels are directed generally perpendicularly to terminal side 17 of the base, and support pivot member 18 for sliding movement therein. To adjustably slide pivot member 18 within channels 16, differential adjusting screw 19 engages an end flange on the pivot member, as will be further discussed hereinafter. Pivot member 18 thus operates as a linearly movable support for the left side of spring 15 (as viewed in FIG. 3), its supporting position being responsive to the rotation of differential adjusting screw 19 within knurled nut 20.

Besides mounting the toggle spring adjusting means and the switch contacts, base 2 also includes a pair of stops 21 and 22 which are molded therein. These stops serve to limit the movement of contact operating member 23.

Frame 3 of my switch is of generally U-shaped configuration, being preferably formed by bending a single flat piece of sheet metal into oppositely disposed symmetrical legs 25 and connecting portion 27, as best illustrated by the exploded view of FIG. 5. Adjacent leg ends 26, each frame leg 25 includes a specially configured slot 25a, and inwardly bent upper and lower tabs 25b and 25c, respectively. The principal purpose of these frame slots 25a and inwardly bent tabs 25b and 25c is to provide a convenient means for supporting frame 3 upon insulating base 2. Base 2 has a pair of specially configured oppositely disposed ears 2a at two of its sides, which receive the slots 25a of the frame. An outer side edge of each inwardly bent tab 25c of the frame engages an end of the base 2. With the ears 2a received within slots 25a of the frame, and the side edge of each tab 25c engaging the end of the base, tongues 5b of cover plate 5a are slipped underneath tabs 25b of the frame and serve as levers to securely mount the frame upon the base as the opposite end of cover plate 5a is pressed downwardly upon connecting portion 27 of the frame. The particular construction of frame 3 and base 2 for mounting the former thereon comprises the invention of Charles Grimshaw, and this construction and arrangement are described and claimed in his aforesaid copending application Serial Number 818,436.

To actuate the contacts of my switch, I pivotally mount the aforementioned contact operating member 23 in frame 3. The pivotal support for member 23 is provided by trapezoidally configured slots 24 which are formed in frame legs 25. Pivotally supported within these slots 24 of the frame are projecting shoulders or trunnions 28 of member 23 which are spaced forwardly of flanged end 29, which serves as a stiffener for the operating member. This is best shown in the exploded view of FIG. 5. Each of trunnions 28 has a knife edge 30 which is formed by a rear side sloping downwardly towards end 29. When the trunnions 28 of operating member 23 are mounted in their mating slots 24, knife edges 30 of the trunnions pivot at sharp rear corners 31 of each slot, thereby providing a precise support for pivotal motion of the operating member within the frame.

To actuate the contact operating member of the switch, I have provided a new and improved means for transmitting the actuating force thereto. Spaced slightly forward from trunnions 28 of operating member 23 are a pair of raised, aligned knife edges 32, the purpose of which is to provide accurate pivots for supporting bearing 33 thereon. Bearing 33 furnishes a means for transmitting bellows force to operating member 23, and serves a very important purpose. In cross-section, knife edges 32 are formed in the shape of an inverted V (as viewed in FIGS. 3 and 5) and project inwardly toward the center of opening 34 of the operating member, to receive grooves 35 of the bearing. Grooves 35 are also aligned and formed with their cross-sections in the shape of an inverted V having a greater internal angle than that of knife edges 32. Grooves 35 and raised knife edges 32 are in alignment with each other so that when bearing 33 pivotally rests upon operating member 23, distinct pivot locations are provided by knife edges 32 of the operating member and the lines of mating contact of grooves 35. As shown, the aforementioned grooves 35 are formed on upper shoulders 36 of bearing 33, and below the shoulders, the bearing includes depending and oppositely disposed parallel pairs of struts 37, and base portions 38.

Knife edges 30 and 32, sharp rear slot corners 31, and V-shaped grooves 35 are, of course, not entirely sharp, but rather they are shaped with minute radii of curvature. These radii are of such values as to avoid interference between the mating parts and thereby support useful loads while keeping frictional torques at a minimum.

So that the grooves 35 will accurately and pivotally engage knife edges 32 of the contact operating member to transmit force thereto, altitude adjusting screw 39 has been used as an actuator. This actuator or screw 39 directly receives condition responsive force from the bellows 44 and biasing force from range spring 43 (as will be more fully explained hereinafter), transmitting the difference between these two forces to the bearing. The actuator screw or pin 39 includes, as best shown in FIG. 6, slotted head 39a, threaded portion 39b, smooth surfaced lower portion 39c, and narrow end portion 39d. Intermediate lower portion 39c and end 39d of the screw there is a frusto-conically shaped annular shoulder 42. This shoulder 42 engages a slightly flattened annular seat 41 of bearing 33 to transmit the difference force thereto. The purpose of the engagement relationship between shoulder 42 and seat 41 is to allow the bearing a modest amount of freedom to swivel about actuator 39 at that point. It will be understood that if desired the shoulder 42 may be somewhat differently shaped, for example spherically, to obtain the same result as the illustrated shoulder.

The specific advantages garnered by the use of my force transmitting bearing and its associated actuator screw may be succinctly stated as the provision is an improved condition responsive switch of a means for substantially eliminating calibration shift caused by imprecise actuation of the contact operating member. Many other significant advantages are also achieved by this structure, however. By locating the bearing member 33 at precise, positive pivot points on the contact operating member 23 and transmitting the actuating force first to the actuator 39 about which bearing 33 swivels, the relative position of the contact operating member to the actuator screw 39, range spring 43, and bellows 44, has also been made precise. As the cold control switch cycles to room temperature or above, and then down again, regardless of cycling between working and room or shipping temperatures, or the biasing force provided by range spring 43, bearing 33 will reseat itself each time at precisely the same location on the contact operating member.

To insure that the inner portions of pivoting knife edges 30 of the operating member have ample room to pivot within their mating slots 24 of frame 3, and minimize frictional contact between side edges 40 and 45 of the operating member, and the frame, the outer edges of trunnions 28 on operating member 23 are made oblique to the length thereof. In this manner operating member 23 is widest approximately at the outer ends of knife edges 30. Operating member 23 is thus located at end points 30a between the sides 56 of bellows cup 57, and the resulting friction at the points of contact of points 30a with sides 56 produces a negligible frictional torque.

Outwardly curved protuberances 48 and 49 are provided on opposite side edges 40 and 45 respectively of the operating member, between raised knife edges 32 and contact actuating arm 23a, to locate the operating member 23 between frame legs 25 before mounting the bellows assembly 4 to the frame. In the complete control these protuberances serve no operative function.

To provide manual "off" control, of operating member 23, manual stop extension 46 is spaced forwardly from protuberance 49 and adjacent edge 45 of the operating member, and it projects upwardly in a direction generally perpendicular to the face of the operating member. Upwardly directed point 47 is provided on this extension to contact a manually adjustable control means for opening the switch contacts. This manually adjustable control means will be further described hereinafter.

To provide a means for continually biasing operating member 23 in the direction of the closed position of the switch contacts, or with a continuous clockwise moment of biasing force about knife edges 30 (as shown in FIG. 3), I have provided the previously mentioned U-shaped toggle spring 15. As best shown in FIGS. 3 and 5, toggle spring 15 has indented end portions 15a and 15b for mounting the spring in continuous compression between pivot member 18 and operating member 23 respectively. Knife edge 50 is formed in the forward end of member 23 to engage indented portion 15b of the toggle spring and thereby receive the transmission of the continuous biasing force of the toggle spring.

To support the indented or pivoting edge 15a of toggle spring 15, pivot member 18 has a central knife edge 51 which inclines slightly downwardly (as best viewed in FIG. 5) to engage indented portion 15a of the spring, forming a knife edge contact therewith. At each end of pivot member 18, a pair of spaced doubly bent fingers 52 extend outwardly. These fingers 52 specifically are formed at the corners of member 18, and together with body surface 53 thereof they provide bearing surfaces for sliding movement of member 18 within the channels 16. In particular, the fingers fit within channels 16 of the base, to serve as guides for the sliding movement. On the side opposite to downwardly inclined knife edge 51, pivot member 18 has an upwardly extending central flange 54 engaged by the leading or forward end 55 of differential adjusting screw 19. As previously described, by manual rotation of screw 19, it can thus move pivot member 18 toward or away from toggle spring 15, and the compression of the toggle spring 15 may thereby be adjusted by the knife edge contact between edge 51 of the pivot member and indented edge 15a of the toggle spring. Channels 16 serve to guide the movement of the sliding pivot member so that pivoting edge 15a of the toggle spring is moved horizontally (as viewed in FIG. 3) with a linear motion. Axial movement of screw 19 thus varies the biasing force supplied by the toggle spring and thereby alters the temperature differential of the cold control, while pivot member 18 sliding within channels 16 precludes any significant vertical movement of the indented pivoting edge 15a of the toggle spring.

As previously noted, base 2 has molded therein fixed stops 21 and 22 which are provided for limiting the upward and downward movement of operating member 23 between two fixed points. By limiting the movement of the operating member between these stops, the possibility of reaching the limits of the particular toggle spring is thereby precluded. Thus at all times, the biasing force provided by the toggle spring is within the most desirable range of the spring potential.

The combination of limiting stops 21 and 22 coupled with the differential adjustment of toggle spring 15 by linearly guided movement of pivot member 18 with its variably positioned knife edge point of contact, provides a substantially improved tolerance control over the "offset" of the toggle spring. This combination comprises the invention of Charles Grimshaw, and this construction and arrangement are described and claimed in his aforesaid copending application Serial Number 183,534.

To provide a continuous downward biasing force upon bearing 33, and therefore a continuous counterclockwise moment of biasing force upon operating member 23 about pivoting knife edges 30 (as viewed in FIG. 3), I have utilized the previously referred to range spring 43. Range spring 43 transmits its compressive force to altitude screw 39 via nut 60 which is threaded thereto, as shown in FIG. 6. To provide relatively precise seating contact, upper end 43a and lower end 43b of spring 43 are ground very nearly "square" (i.e. flat and parallel to each other), when the spring is in an unloaded condition. Lower end 43b of the spring rests upon upper annular flange surface 61 of altitude nut 60, and upper end 43a of the spring bears upon lower annular surface 62 of cam follower eyelet 63. To retain lower end 43b of spring 43 upon surface 61 of nut 60, an annular groove 61a is formed adjacent to surface 61, this groove serving as a detent for receiving the lower turn of spring 43.

By varying the compression of range spring 43, the temperature level at which my cold control operates may be adjusted. To effect this variation, I provide manually adjustable cam 64 which is rotatably mounted on cover plate 5a by shaft 65, and engages pivotally mounted cam follower 66. Follower 66 is responsive to the rotary position of cam 64, and cam follower eyelet 63 is pivotally mounted thereon. Cam 64 may be constructed of die cast zinc and includes gradual sloping portion 67, and abrupt sloping portion 68, as best shown in FIG. 3. These sloping portions 67 and 68 of cam 64 serve to provide a manual adjustment for the compression of range spring 43 by engagement with curved extension 69 of cam follower 66. To facilitate the manual rotation of cam 64, shaft 65 is secured thereto by some suitable means such as a press fit. Most of the cam is disposed within circular recess 70 which is formed within raised annulus 71 of cover plate 5a, as shown best by FIG. 3. An annular shoulder portion 72 of cam 64 extends upwardly through an aperture 73 in the cover plate and key projection 74 of the cam enters a mating slot of a knob mounting adapter 75 which is affixed to shaft 65. Spring washer 76 is positioned between adapter 75 and the upper surface area of the plate immediately surrounding aperture 73. To provide a limiting stop for the rotation of cam 64, downwardly lanced portion 77 projects slightly into recess 70, to engage lateral extension 78 of cam 64. (See FIGS. 3 and 5.) Extension 78 also serves to contact rearward facing surface 47a of point 47 on extension 46 of operating member 23, to provide a "manual-off" pivoting movement of operating member 23 and thus open the switch contacts.

Cam follower 66 of my switch is pivotally mounted in connecting portion 27 of frame 3 by means of fingers 79 which are bent upwardly (as viewed in FIG. 5) and engage the upper edges 80 of spaced slots 81 of connecting portion 27. Sharp inner edges 82 are formed at the base of fingers 79. To provide a slight upward biasing of inner edges 82 of fingers 79 against upper edges 80 about which the cam follower pivots, spring tab 83 is provided in frame connecting portion 27. Tab 83 is bent slightly inwardly and then outwardly from connecting portion 27 (as viewed in FIG. 5) and furnishes a spring biasing force against cam follower 66 by engaging central nose 84 thereof. The nose 84 specifically engages and is biased by inwardly extending angular shoulder portion 85 of the tab 83.

Cam follower 66 also includes aperture 89, and a pair of radially disposed spaced ridges 86 on its underside, the ridges extending downwardly as best shown in FIGS. 3 and 5, to provide a pivoting axis for cam follower eyelet 63 thereon. Upwardly extending tabs 87 of eyelet 63 are received by spaced slots 88 at the outer ends of ridges 86 and then turned outwardly to mount the eyelet on the ridges 86 of the undersurface of the cam follower. (See FIG. 4.)

To provide access to range screw 39, apertures 89 and 90 are provided in the cam follower 66 and cover plate 5a, respectively, and these apertures are in alignment with the altitude screw 39, so that a presetting adjustment may be made of the range spring compression by adjusting the relationship of altitude screw 39 with its associated nut 60, after the control switch is assembled.

For mounting switch 1 to a suitable supporting panel, mounting extensions 91 are provided at each end of cover plate 5a. Each extension includes a threaded aperture 92 to engage a suitable mounting screw.

Turning now to the bellows assembly 4 of my switch, I have provided bellows cup or housing 57 for supporting and containing bellows 44. To securely mount bellows cup 57 upon frame 3, a pair of spaced toes 94 extend outward from inner end 95 of the cup to engage tabs 25c of the frame by conveniently slipping underneath. Tabs 25c of the frame by conveniently slipping underneath. Tabs 25c of the frame thus serve the twofold purpose of both engaging the base to help mount the frame thereon, and receiving toes 94 of the bellows cup 57 to help mount the bellows assembly thereon. For locking the bellows assembly rigidly against lower edge 96 of each frame leg, a pair of spaced slots 97 are provided on the bellows cup, each of which is adjacent to outer end 98 and sides 56. Adjacent to rear end 100 of cover plate 5a, a pair of spaced laterally extending indentations 101 are formed in the upper surface thereof. For rigidly clamping rear end 100 of cover plate 5a and outer end 98 of bellows cup 57 against upper edge 102 and lower edge 103, respectively, of frame connecting portion 27, I utilize two spring clips 104, each of which compresses the adjacent ends of cover plate 5a and bellows cup 57 against the opposite edges of connecting portion 27, by engaging an indentation 101 of the cover and an oppositely disposed slot 97 of the bellows cup. This is best shown in FIG. 3.

Bellows cup 57 also includes a depending flange 105 with projecting arm 106 extending therefrom for supporting capillary 107. Capillary 107 is connected to suitable bulb 108 and contains a thermally responsive fluid such as methyl chloride or dichlorodifluoromethane.

For furnishing the temperature responsive actuating force for the switch, bellows 44 is mounted within the bellows cup 57. A restraining annulus 109, having supporting arms fitted into an annular groove in the inner wall of the bellows cup, restricts the upward movement of bellows 44. To provide the transmission area for the temperature responsive force, bellows 44 has a central conically-shaped recess 44a within which a smaller recess 4b is also contained. Recess 44b receives the lower tip of actuator 39 and has an upwardly projecting nose 110 centrally disposed therein, which bears against the lower tip of altitude screw 39. It will be seen that with this construction of bellows 44 and actuator 39, the lower tip of actuator 39 can vary only slightly in position with regard to the bellows, thereby assuring uniformity of force transmission each time the bellows expands or contracts.

Altitude screw 39 also receives the downward biasing force of range spring 43 and transmits the difference of the forces of spring 43 and bellows 44 to bearing 33 and the operating member 23. More specifically, as mentioned above, annular conical shoulder 42 of altitude screw 39 transmits the difference force to bearing 33 by engagement with flattened annular seat 41 thereof, and bearing 33 actuates the operating member or lever 23.

Considering now the operation of the improved condition responsive switch mechanism which I have disclosed, let us first assume that my switch is utilized with a refrigeration machine, to control the compressor unit thereof by means of opening and closing its electrical contacts in response to bulb or capillary temperature. Assuming that the bulb 108 or capillary 107 is at a temperature slightly above the "on" temperature of the cold control, the contact operating member 23 would then be in the position 23a, as shown by the dotted lines of FIG. 3, with the contacts biased to their normally closed position. At this position, the load on operating member 23 at knife edge pivot points 32 is low, being only enough to maintain engagement of the bearing 33 with the operating member and altitude screw 39 at knife edges 32 and shoulder 42, respectively. At this time, the bellows force is nearly equal to the range spring force, and the toggle spring 15 is holding the operating arm against stop 21. Toggle spring 15, which is shown by dotted line 15a, is then in a position off of dead center its maximum distance. It, therefore, supplies its maximum biasing force against knife edge 50 of operating member 23. Bearing 33 can swivel about shoulder 42 of altitude screw or actuator 39 as necessary, to maintain a unique engagement at knife edges 32 and shoulder 42, and to transmit the difference of the range spring force and the bellows force to the operating member as a force moment about pivoting knife edges 30 of the operating member. This force moment, as above indicated, is relatively low.

With the compressor of the refrigerating machine then in operation due to the contacts of the switch being closed, substantial cooling in the vicinity of the bulb or capillary tube of the bellows assembly ensues. As the compressor pulls down the temperature, the capillary or bulb senses this dropping temperature and consequently causes the temperature responsive fluid contained therein to decrease the internal vapor pressure on the bellows. The force exerted upwardly upon range screw 39 by the bellows thus gradually decreases, and the temperature drop causes an increasing resultant downward force to be exerted upon pivot points 32 by range spring 43. In other words, bearing 33 exerts a force moment upon operating member 23 at knife edges 32 thereof which is determined by the difference between the forces of the range spring and the bellows. Toggle spring 15 exerts a continuous biasing force upon knife edge 50 of operating member 23, and this force has a clockwise moment about pivot points 30 of the contact operating member (as viewed in FIG. 3). The clockwise moment is a maximum when the operating member is in dotted position 23a against stop 21, as shown in FIG. 3. The toggle spring is then in dotted position 15a, a maximum distance from its dead center position. When the temperature reaches a point where the counterclockwise moment of the force transmitted to pivots 32 by bearing 33 just exceeds the clockwise moment of the toggle spring biasing force at knife edge 50 of operating member 23, the operating member 23 snaps to the solid or lower position as shown in FIG. 3. The contacts are thus opened, by the downward movement of pin 23b of actuating arm 23a against an extension of the leaf spring strip which carries movable contact 14. With the contacts open, the circuit to the compressor motor is opened, interrupting the cooling operation.

With the operating member in position 23 against stop 22 (as shown in FIG. 3), the toggle spring is in position 15, a minimum distance from its dead center position, and thereby produces a slight but definite clockwise biasing force upon the operating member. As the temperature of the capillary or bulb then starts to increase, the vaporization of some of the fluid therein causes the bellows internal pressure to increase accordingly. At first, the bellows will not move because the force of the range spring is sufficiently greater than the opposing force of the bellows. But, with further temperature increase in the vicinity of the capillary or bulb, the bellows internal pressure increases until the bellows force becomes more nearly equal to the range spring force, and the counterclockwise moment of the difference force is exceeded by the small clockwise moment of the toggle spring biasing force which is exerted upon operating member 23 while it rests against stop 22. At this point the spring 15 toggles the contact operating member to its upper position. This, of course, allows the contacts to move to the "on" position and again energizes the circuit to the compressor.

It will thus be seen that by means of my bearing 33 and actuator 39, together with the precise pivotal knife edge contact of the bearing with operating lever 23 thereby obtained, a new and vastly improved structure for a condition responsive switch has been achieved. By means of the knife edge contact of my bearing with the contact actuating lever, and the transmission of the force difference of the condition responsive and biasing forces to the bearing by an actuator about which the bearing swivels, precise and consistent actuation of the operating lever is obtained throughout the life of the switch.

To adjust the differential temperature of the control switch, that is, to adjust the difference between the "on" and "off" temperatures of the control, one needs merely to rotate the differential adjusting screw 19 which is externally accessible from the terminal side of insulating base 2.

For varying the temperature levels at which the switch is responsive to open and close its contacts, shaft 65 is rotated. This changes the position of cam 64 and thereby varies the compression on range spring 43. Turning the shaft 65 in a counterclockwise direction causes the cam slopes 67 and 68 to move over raised surface 69 of the cam follower and thereby variably deflect the cam follower 66 and pivoted eyelet 63, to gradually increase the compression upon range spring 43. Increasing the range spring compression means that added bellows pressure is required for operating member 23 to toggle to the "on" position, and therefore increases the temperature level at which the contacts of the cold control will respond. The rotation of the shaft 65 in other words raises or lowers the "on" and "off" temperature together, while not materially affecting the differential therebetween.

Although my invention is not limited to any particular manner of assembly of the switches in which it is incorporated, reference may be had to the aforesaid copending application of Charles Grimshaw, Serial Number 818,436, for one manner in which the disclosed switch may be assembled.

While in accordance with the patent statutes, I have described what at present is considered to be the preferred embodiment of my invention, it will be obvious to those skilled in the art that various changes and modifications may be made therein without departing from the invention, and I, therefore, aim in the following claims to cover all such equivalent variations as fall within the true spirit and scope of the invention.

What I claim as new and desire to secure by Letters Patent of the United States is:

1. A condition responsive switch comprising a pair of contacts, a contact operating means for actuating said contacts, said contact operating means including a movable operating member, a force transmitting bearing movable with respect to said member and having a knife edge contact with said operating member, an actuator for urging said bearing against said operating member to actuate said operating member, means for allowing angular movement of said bearing relative to said actuator, a condition responsive means urging said actuator in one direction, and a control spring biasing said actuator in the opposite direction, whereby the difference between the forces of said condition responsive means and said spring is transmitted by said actuator to said bearing to actuate said operating member and the contact of said bearing with said operating member is precisely maintained from cycle to cycle.

2. A condition responsive electric switch comprising a pair of contacts, a contact operating member for actuating said contacts, a pair of aligned projecting knife edges on said contact operating member, said knife edges having a V-shaped configuration, a force transmitting bearing for actuating said contact operating member, a pair of aligned grooves on said bearing, said grooves having a V-shaped configuration and fitting over said knife edges to provide a line contact for said bearing with said contact operating member, an actuator for urging said bearing against said operating member to actuate said operating member, means for connecting said bearing and said actuator and allowing angular movement of said bearing relative to said actuator, a condition responsive means urging said actuator in one direction, and a control spring biasing said actuator in the opposite direction, whereby the difference between the forces of said condition responsive means and said spring is transmitted by said actuator to said bearing to actuate said operating member and the contact of said bearing with said operating member is precisely maintained from cycle to cycle.

3. A condition responsive electric switch comprising a pair of contacts, a contact operating lever for actuating said contacts, a pair of aligned projecting V-shaped knife edges on said contact operating lever, a force transmitting bearing for actuating said contact operating lever, said bearing having a pair of aligned V-shaped grooves fitting over said knife edges to provide a knife edge contact for said bearing with said lever, a longitudinally movable pin for urging said bearing against said lever to actuate said lever, means for connecting said bearing and said pin and allowing said bearing to swivel around said pin, a condition responsive means urging said pin in one direction, and a control spring urging said pin in the opposite direction, whereby the difference between the forces of said condition responsive means and said spring is transmitted by said pin to said bearing to actuate said operating lever and the contact of said bearing with said operating member is precisely maintained from cycle to cycle.

4. A condition responsive electric switch comprising a pair of contacts, a contact operating member for actuating said contacts, a pair of aligned projecting V-shaped knife edges on said contact operating member, a force transmitting bearing for actuating said contact operating member, a pair of aligned V-shaped grooves on said bearing, said grooves engaging said knife edges to provide a knife edge contact for said bearing with said contact operating member, a screw for urging said bearing against said operating member to actuate said operating member, said screw having an annular shoulder in swiveling engagement with said bearing, a nut in threaded engagement with said screw, a condition responsive means urging said screw in one direction, and a control spring engaging said nut to bias said screw in the opposite direction, whereby the difference between the forces of said condition responsive means and said spring is transmitted by said shoulder of said screw to said bearing to actuate said operating member and the contact of said bearing with said operating member is precisely maintained from cycle to cycle.

5. A condition responsive electric switch comprising a pair of contacts, a contact operating member for actuating said contacts, a pair of aligned projecting V-shaped knife edges on said contact operating member, a force transmitting bearing for actuating said contact operating member, a pair of aligned V-shaped grooves on said bearing, said knife edges engaging said grooves to provide a knife edge contact for said bearing with said contact operating member, a screw for urging said bearing against said operating member to actuate said operating member, an annular shoulder on said screw arranged in swiveling engagement with said bearing, a nut in adjustable threaded engagement with said screw, a condition responsive means urging said screw in one direction, and a control spring engaging the nut to bias said screw in the opposite direction, whereby the difference between the forces of said condition responsive means and said spring is transmitted by the annular shoulder of said screw to said bearing to actuate said operating member and the contact of said bearing with said operating member is precisely maintained from cycle to cycle, said nut and screw being relatively adjustable, thereby to vary the biasing force of said control spring on said screw.

6. A condition responsive electric switch comprising a pair of contacts, a lever for actuating said contacts, a pair of aligned projecting V-shaped knife edges on said lever, a force transmitting bearing for actuating said lever, a pair of aligned V-shaped grooves on said bearing and fitting over said knife edges to provide a line contact between said lever and said bearing, a screw for urging said bearing against said lever to actuate said lever, said bearing having an annular seat and said screw having an annular shoulder for engaging said seat, a nut in adjustable threaded engagement with said screw, a condition responsive means urging said screw in one direction, a control spring one end of which engages said nut to provide a biasing force against said screw in the opposite direction, said screw transmitting the difference between the forces of said condition responsive means and said spring to said bearing by engagement of said annular shoulder of said screw with said annular seat of said bearing to actuate said lever, a manually rotatable cam, a cam follower means engaged by said cam and having its position responsive to the rotary position of said cam, said cam follower means engaging the other end of said spring, whereby the manual rotation of said cam provides a first means for varying the biasing force of said spring, said screw and nut being relatively adjustable thereby to provide a second means for varying the biasing force of said spring.

7. A condition responsive electric switch comprising a pair of contacts, a lever for actuating said contacts, a pair of aligned projecting V-shaped knife edges on said lever, a force transmitting bearing for actuating said contact operating lever, said bearing including a base portion having an annular seat, a pair of spaced shoulders each of which has an aligned V-shaped groove formed therein, and two pairs of struts each of which joins one of said shoulders to said base, said knife edges engaging said grooves to provide a line contact between said lever and said bearing, a screw for urging said bearing against said lever to actuate said lever, an annular shoulder on said screw for engaging the seat of said bearing, a nut in adjustable threaded engagement with said screw, a condition responsive means urging said screw in one direction, a control spring one end of which engages said nut to provide a biasing force against said screw in the opposite direction, said screw transmitting the difference between the forces of said condition responsive means and said spring to said bearing by engagement of the annular shoulder of said screw with said annular seat of said bearing to actuate said lever, a manually rotatable cam, a cam follower means engaged by said cam and having its position responsive to the rotary position of said cam, said cam follower means engaging the other end of said spring, whereby the manual rotation of said cam provides a first means for varying the biasing force of said spring, said screw and said nut being relatively adjustable thereby to provide a second means for varying the biasing force of said spring.

8. A condition responsive electric switch comprising a pair of contacts, a lever for actuating said contacts, a pair of aligned projecting V-shaped knife edges on said lever, a force transmitting bearing for actuating said contact operating lever, said bearing including a base portion having an annular seat, a pair of spaced shoulders each of which has an aligned V-shaped groove formed therein, and two pairs of struts each of which joins one of said shoulders to said base, said knife edges engaging said grooves to provide a line contact between said lever and said bearing, a screw for urging said bearing against said lever to actuate said lever, an annular shoulder on said screw for engaging the seat of said bearing, a nut in adjustable threaded engagement with said screw, a condition responsive means urging said screw in one direction, a control spring one end of which engages said nut to provide a biasing force against said screw in the opposite direction, said screw transmitting the difference between the forces of said condition responsive means and said spring to said bearing by engagement of the annular shoulder of said screw with said annular seat of said bearing to actuate said lever, a manually rotatable cam, a cam follower engaged by said cam and having its position responsive to the rotary position of said cam, said follower having a pair of spaced aligned ridges on the undersurface thereof, a cam follower eyelet pivotally mounted upon the undersurface of said cam follower with said ridges providing a pivoting axis for said eyelet, said eyelet engaging the other end of said spring, whereby the manual rotation of said cam provides a first means for varying the biasing force of said spring, said screw and said nut being relatively adjustable thereby to provide a second means for varying the biasing force of said spring.

9. A temperature responsive electric switch comprising a pair of contacts, a contact operating member for actuating said contacts, a pair of aligned projecting knife edges on said contact operating member, said knife edges having a V-shaped configuration, a force transmitting bearing for actuating said contact operating member, a pair of aligned grooves on said bearing, said grooves having a V-shaped configuration and fitting over said knife edges to provide a line contact for said bearing with said contact operating member, an actuator for urging said bearing against said operating member to actuate said operating member, means for connecting said bearing and said actuator and allowing said bearing to swivel around said actuator, said actuator having a narrow end portion, a bellows having a recess for receiving said end portion of said actuator, said bellows urging said actuator in one direction by the exertion of bellows force upon the end portion of said actuator, and a control spring biasing said actuator in the opposite direction, whereby the difference between the forces of said bellows and said spring is transmitted by said actuator to said bearing to actuate said operating member and the contact of said bearing with said operating member is precisely maintained from cycle to cycle.

10. A condition responsive electric switch comprising a pair of contacts, a contact operating member for actuating said contacts, a pair of aligned projecting V-shaped knife edges on said contact operating member, a force transmitting bearing for actuating said contact operating member, a pair of aligned V-shaped grooves on said bearing, said knife edges engaging said grooves to provide a knife edge contact for said bearing with said contact operating member, a screw for urging said bearing against said operating member to actuate said operating member, said screw having an annular shoulder and a narrow end portion, said shoulder of said screw arranged in swiveling engagement with said bearing, a nut in adjustable threaded engagement with said screw, a bellows urging said screw in one direction and having a recess for receiving said end portion of said screw, said bellows urging said screw in one direction by the exertion of bellows force upon the end portion of said screw, and a control spring engaging the nut to bias said screw in the opposite direction, whereby the difference between the forces of said bellows and said spring is transmitted by the annular shoulder of said screw to said bearing to actuate said operating member and the contact of said bearing with said operating member is precisely maintained from cycle to cycle, said nut and screw being relatively adjustable, thereby to vary the biasing force of said control spring on said screw.

11. The switch of claim 6 wherein the annular shoulder of said screw is frusto-conical in configuration.

12. The switch of claim 6 wherein the annular shoulder of said screw is spherical in configuration.

References Cited in the file of this patent

UNITED STATES PATENTS

| | | |
|---|---|---|
| 1,858,005 | Eggleston | May 10, 1932 |
| 1,905,788 | Bast | Apr. 25, 1933 |
| 1,915,498 | Kellett | June 27, 1933 |
| 2,184,339 | Ettinger | Dec. 26, 1939 |
| 2,250,437 | Persons | July 22, 1941 |
| 2,658,121 | Gray et al. | Nov. 3, 1953 |
| 2,762,888 | Jacobs | Sept. 11, 1956 |

FOREIGN PATENTS

| | | |
|---|---|---|
| 445,745 | Great Britain | Apr. 17, 1935 |
| 162,613 | Australia | Apr. 28, 1955 |